3,549,647
BIS- AND TRIS-(THIO-, SULFINYL- AND SULFONYL)PYRIDINES

Howard Johnston, Walnut Creek, Calif., assignor to The Dow Chemical Company, Midland, Mich., a corporation of Delaware
No Drawing. Filed Dec. 3, 1968, Ser. No. 780,896
Int. Cl. C07d 31/48, 31/50
U.S. Cl. 260—294.8                 6 Claims

ABSTRACT OF THE DISCLOSURE

The present disclosure is directed to bis- and tris-(thio-, sulfinyl- and sulfonyl)pyridines corresponding to the formula

R—M—Z wherein each R, taken separately, represents alkyl, monohaloloweralkyl, dihaloloweralkyl, trihaloloweralkyl, phenyl, monohalophenyl, benzyl and monohalobenzyl; M represents sulfide (—S—), sulfinyl

or sulfonyl

and Z represents

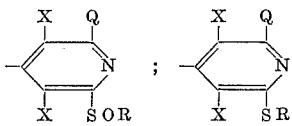

or

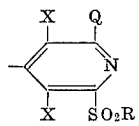

in which X represents chlorine, bromine or hydrogen and Q represents —SR, —SOR, —SO$_2$R, hydrogen, chlorine or bromine, with the proviso that when Z is bromine, Q is other than chlorine; the preparation and use of these compounds as pesticides is also taught.

SUMMARY OF THE INVENTION

The present invention is directed to bis- and tris-(thio-, sulfinyl- and sulfonyl)pyridines corresponding to the formula

R—M—Z

In this and succeeding formulae, each R, taken separately, represents alkyl, monohaloloweralkyl, dihaloloweralkyl, trihaloloweralkyl, phenyl, monohalophenyl, benzyl, and monohalobenzyl; M represents sulfide (—S—), sulfinyl

or sulfonyl

and Z represents

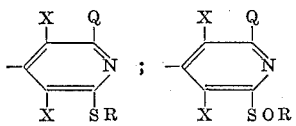

or

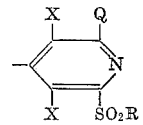

in which X represents chlorine, bromine or hydrogen and Q represents —SR, —SOR, —SO$_2$R, hydrogen, chlorine or bromine, with the proviso that when X is bromine, Q is other than chlorine.

The term "alkyl" as employed in the present specification and claims designates an alkyl group containing 1, 2, 3, 4, etc. and up to 12 carbon atoms and from 1 to 2, to 3, to 4, to 5, to 6, etc. and up to and including 12 carbon atoms such as dodecyl, octyl, heptyl, hexyl, sec-hexyl, butyl, decyl, 4-methyldecyl undecyl, nonyl, isobutyl, tert-butyl, isoamyl, amyl, propyl, ethyl, isopropyl, 3-ethylnonyl, 2-ethylhexyl and 3-propylheptyl. The expression "loweralkyl" is employed in the present specification and claims to designate an alkyl group containing 1, 2, 3, 4 and 5 carbon atoms and from 1 to 2, to 3, to 4, to 5 carbon atoms such as methyl, ethyl, isopropyl, propyl, tert-butyl, butyl, amyl, sec-amyl, etc. Also, the terms "halogen" and "halo" are employed herein to represent chlorine and bromine. Representative haloloweralkyl moieties include omega-trihaloloweralkyl; omego-dihaloloweralkyl; omega-haloloweralkyl; alpha-haloloweralkyl; alpha-dihaloloweralkyl; 2,3-dihalopropyl, butyl or amyl; 2,2,3-trihalopropyl, butyl or amyl; 3,4-dihalobutyl; 3,4-dihaloamyl; 4,5-dihaloamyl; 2,3,4-trihalobutyl; 3,4,4-trihalobutyl; etc.

For convenience, those compounds of the present invention wherein M represents the sulfide group (—S—) are identified as thiopyridines; those compounds wherein M represents the sulfinyl group

are identified as sulfinylpyridines and those compounds wherein M represents the sulfonyl group

are identified as sulfonylpyridines.

The pyridines of the present invention are crystalline solids or oils which are of low solubility in water and of moderate solubility in common organic solvents. These pyridines are useful as pesticides for the control of various pests such as insects, bacteria, fungi and aquatic and terrestrial plants. Representative pests include two-spotted spider mite, yellow fever mosquito, southern army worm, Staphylococcus aureus, Trichophyton mentagrophytes, Candida albicans, Bacillus subtilis, Aspergillus terreus, Candida pelliculosa, Rhizopus nigricans, bean mildew, downy mildew, rice blast, apple scab fungus, tomato late blight, fire blight bacterium, potato scab fungus, pigweeds, Chlorella algae, milfoil and the water plants Elodea, Cabomba, moneywort, Salvinia and coontail.

Representative bis- and tris-(thio-, sulfinyl- and sulfonyl)pyridines include:

2,3,5-trichloro-4,6-bis(methylthio)pyridine;
2,3,5-trichloro-4,6-bis(propylthio)pyridine;
2,3,5-trichloro-4,6-bis(butylthio)pyridine;
3,5,6-trichloro-2,4-bis(butylthio)pyridine;
2,3,5-trichloro-4,6-bis(dodecylthio)pyridine;
2,3,5-trichloro-4,6-bis[(chloromethyl)thio]pyridine;
3,5-dichloro-2,4-bis(methylthio)pyridine;
2-bromo-3,5-dichloro-4,6-bis(methylthio)pyridine;
2,3,5-tribromo-4,6-bis(methylthio)pyridine;
2,3,5-trichloro-4,6-bis[(m-chlorobenzyl)thio]pyridine;
3,5-dichloro-2,4,6-tris[(chloromethyl)thio]pyridine;
3,5-dichloro-2,4,6-tris(methylthio)pyridine;
2,3,5-trichloro-4,6-bis[(chloromethyl)sulfinyl]pyridine;
3,5-dichloro-2,4,6-tris[(chloromethyl)sulfinyl]pyridine;

2,3,5-trichloro-4,6-bis(methylsulfinyl)pyridine;
2,3,5-trichloro-4,6-bis[(p-chlorobenzyl)sulfinyl]pyridine
2,3,5-tribromo-4,6-bis(methylsulfinyl)pyridine;
2,3,5-trichloro-4,6-bis(methylsulfonyl)pyridine;
2,3,5-trichloro-4,6-bis[(p-chlorophenyl)sulfonyl]
 pyridine;
2,3,5-trichloro-4,6-bis(dodecylsulfonyl)pyridine;
2,3,5-tribromo-4,6-bis(methylsulfonyl)pyridine;
2,3,5-trichloro-4,6-bis(propylsulfonyl)pyridine;
2,3,4-tris(methylthio)pyridine;
3,5-dichloro-2,4-bis(methylsulfonyl)pyridine;
3,5-dichloro-2,4,6-tris(methylsulfonyl)pyridine;
3,5,6-trichloro-2,4-bis(butylsulfonyl)pyridine;
3,5-dibromo-2,4,6-tris(methylsulfonyl)pyridine;
5-chloro-4,6-bis(methylthio)pyridine;
2,3,5-trichloro-4-(methylsulfonyl)-6-(butylsulfonyl)
 pyridine;
2,3,5-trichloro-4,6-bis(n-hexylsulfinyl)pyridine;
2,3,5-trichloro-4-[(chloromethyl)sulfonyl]-6-(butyl-
 sulfonyl)pyridine;
2,3,5-trichloro-4-(methylthio)-6-(butylthio)pyridine; and
2,3,5-trichloro-4,6-bis[(p-chlorophenyl)thio]pyridine.

The new compounds of the present invention are prepared by a variety of methods. The bis- and tris-thiopyridines are prepared by reacting in the presence of a polar organic solvent an alkali metal mercaptan salt (R—S-alkali metal wherein R is one of the nonhalogenated moieties as defined hereinbefore and the alkali metal is sodium or potassium) with a halopyridine compound corresponding to the formula

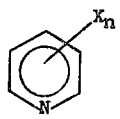

wherein X is as defined hereinbefore and $n$ represents an integer of 3 to 5 or an alkylmercaptohalopyridine of the formula

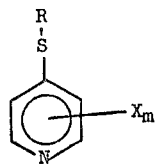

wherein X and R are as defined hereinbefore and $m$ represents an integer of 2 to 4. The reaction proceeds readily under ambient atmospheric pressure at temperatures of from about 50° to about 150° C.; preferably the reflux temperature of the mixture is employed.

The alkali metal mercaptan reactant is conveniently prepared in situ by adding a mercaptan (RSH) to a mixture of a stoichiometric amount of an alkali metal or alkali metal hydroxide in a suitable polar organic solvent such as, for example, ethanol, methanol, isopropanol, dimethylsulfoxide, dimethoxyethane or the like, thereby to form the corresponding alkali metal mercaptan.

The halopyridine and the alkali metal mercaptan are intimately contacted in one of the polar organic solvents listed above to prepare the thiopyridines of the present invention. The reaction to prepare the bis- or tris-thiopyridines consumes the reactants in a ratio of 2 or 3 moles of the alkali metal mercaptan per mole of the halopyridine and the use of such amounts is preferred, or a molar ratio of 1 or 2 if a monothiohalopyridine is employed as the pyridine reactant.

In order to prepare the compounds of the present invention in a single step with the halopyridine starting material, it is necessary that the molar amount of alkali metal mercaptan used must be substantially in excess of the molar amount of halopyridine so as to avoid formation of the monothiopyridines. However, the reaction may be carried out in a stepwise fashion if desired.

In some instances, a stepwise process, i.e., reacting equimolar portions of the pyridine reactant and the alkali metal mercaptan in two or three stages depending upon whether a bis- or tris-thiopyridine is the final product, can be advantageous in that this can produce in the final product predetermined R groups which differ one from another. It is to be understood, however, that in this stepwise process, bis- or tris-thiopyridine compounds having the same R group can also be readily prepared.

During or following the introduction of the reactants, the reaction mixture is maintained at the reaction temperature within the reaction zone for several hours. In a convenient procedure, the reaction mixture can be maintained at the reaction temperature until there is a cessation in the precipitation of the by-product alkali metal halide. Following the reaction period, the solid alkali metal halide is removed as by filtration, and the resulting filtrate concentrated to induce the precipitation of the halothiopyridyl product, the precipitated product being isolated by filtration, decantation or centrifugation or other conventional separatory procedure. In alternate isolation procedures, the substantially alkali metal halide-free product solution is fractionally distilled to obtain the desired bis- or tris-thiopyridine as a distillation product or the solution concentrated to dryness to obtain the product as a residue. In yet another isolation procedure, the product mixture is poured into water whereupon the halothiopyridine precipitates in the aqueous mixture and the precipitated product is then separated by filtration, centrifugation, decantation or the like.

Representative halopyridines employed as starting materials include:

2,3,4,5-tetrachloropyridine;
2,3,4,5,6-pentachloropyridine;
2,3,5-trichloro-4,6-dibromopyridine;
2,3,4,6-tetrachloropyridine;
2,4,6-tribromo-3,5-dichloropyridine;
2,3,4,5,6-pentabromopyridine; and
2,3,4-trichloropyridine.

In preparing the halothiopyridines of the formula

R—M—Z wherein R is monohaloloweralkyl, dihaloloweralkyl or trihaloloweralkyl, a precursor alkylthiopyridine may be prepared as above, followed by the halogenation of the alkyl group. This halogenation is carried out by dissolving the alkylthiopyridine in an inert solvent such as carbon tetrachloride or perchloroethylene and contacting it with a halogenating agent for a few hours at a temperature in the range of 40°–60° C. The addition of more than one halogen atom is accomplished by employing conventional procedures including the use of more elevated temperatures and excess halogenating agent.

In an alternative method for preparing these halothiopyridines, a halohydrocarbylmercaptan such as 2,3-dibromopropylmercaptan, β-chloropropylmercaptan, α-bromopropylmercaptan, p-fluorothiophenol or m-(trifluoromethyl)thiophenol is converted to an alkali metal salt and reacted with the polyhalopyridine.

The halothiopyridines wherein R represents monohalophenyl or monohalobenzyl are prepared by the reaction of the alkali metal salt of monohalophenyl or monohalobenzyl mercaptan with the halopyridine. The alkali metal salt of monohalophenyl- and monohalobenzylmercaptans is prepared in situ by the reaction of an alkali metal with the monohalophenyl- or monohalobenzylmercaptan in a polar solvent following the general procedure for preparing alkali metal mercaptans as hereinbefore defined.

The bis- and tris-thiopyridines wherein at least one R group is different from another R group as hereinbefore indicated are prepared in a stepwise procedure wherein the halopyridine is reacted with an alkali metal mercaptan in the ratio of one mole of the halopyridine per mole of alkali metal mercaptan in the presence of a polar solvent under reaction conditions hereinbefore defined, followed by purification of the product. The monothiopyridine thus produced is reacted with additional alkali metal mercaptan containing a different R group in the ratio of one mole of the monothiopyridine per mole of alkali metal mercaptan. The conditions employed in this step are the same as hereinbefore defined.

The bis- and tris-sulfinylpyridines and the bis- and tris-sulfonylpyridines of the present invention are prepared by reacting the corersponding bis- and tris-thiopyridines with an oxidizing agent. The oxidation of any of the bis- and tris-thiopyridines results, at least partially, in the preparation of the corresponding sulfinylpyridine compound.

The oxidation of one molecular of the halothiopyridine to the corresponding sulfinylpyridine or the oxidation of one molecule of a sulfinylpyridine to the corresponding sulfonylpyridine requires one atom of oxygen for each sulfur atom. The oxidation of the thiopyridines directly to the corresponding sulfonylpyridine, on the other hand, consumes two atoms of oxygen for each sulfur atom in each molecule of thiopyridine so oxidized. In carrying out the various oxidation reactions to prepare the compounds of the present invention, it is preferable to employ oxidizing agent in minor quantities which will provide, at a maximum, oxygen in the stoichiometric quantities consumed in the conversion to either the sulfinyl or sulfonyl compounds. In some instances, the use of a slight excess of the oxidizing agent is preferred. However, the use of the reactants in any particular proportions is not critical, some of the desired product being formed upon combining the reactants in any proportions.

Many times, it is desirable to prepare partial oxidation products of bis-thiopyridines wherein one thio group remains unoxidized and the other is oxidized to the sulfinyl form. Such a product can be prepared by employing equimolar amounts of the oxidizing agent and the thiopyridine wherein the thiopyridine is highly diluted with the polar solvent.

In many instances, the sulfinylpyridine can be prepared and then subjected to continuing oxidative conditions so as to be further oxidized to the corresponding sulfonylpyridine compound. During some operations, depending on the oxidizing agent and process conditions, the oxidation proceeds to the sulfonylpyridine so rapidly that it is not practical to isolate the sulfinyl compound. Representative oxidizing agents for the production of the sulfinylpyridine compounds include nitric acid and hydrogen peroxide and representative oxidizing agent to be employed in the preparation of the sulfonyl compounds include fuming nitric acid, nirtic acid, hydrogen peroxide, potassium permanganate and chromate-sulfuric acid (mixture of alkali metal chromate and sulfuric acid).

Hydrogen peroxide, and conveniently an aqueous solution thereof, can be employed as the oxidizing agent in the production of the sulfinyl- and sulfonylpyridine derivatives of the present invention. In such embodiment, the reaction is carried out in the presence of a liquid reaction media such as acetone, glacial acetic acid or a mixture of acetic acid and acetic anhydride. In a preferred procedure, the acid-anhydride mixture is employed as the liquid reaction medium. The reaction takes place at temperatures of from about 75° to about 120° C. In a convenient method, the reaction is carried out at the boiling temperature and under reflux. In carrying out the reaction, the reactants are contacted in any order or fashion and preferably in amounts stoichiometric for the preparation of the desired product. The reaction mixture is then maintained at a temperature within the reaction temperature range for a short period of time. Following the reaction period, the bis- or tris-(sulfinyl- or sulfonyl)pyridine product can be separated by conventional procedures such as evaporation of the reaction medium to obtain the product as a solid residue. In an alternative procedure, the reaction mixture is washed with cold water and is thereafter filtered, centrifuged or the like to obtain the crystalline product.

Nitric acid is conveniently employed to oxidize the bis- or tris-thiopyridine starting materials to the corresponding bis- or tris-sulfinylpyridines. The reaction can be carried out in the presence of a haloalkane as reaction medium such as carbon tetrachloride, methylene dichloride, ethylene dibromide, etc. In a preferred procedure, excess nitric acid is employed as reaction medium. The reaction proceeds at temperatures between about 15° and about 120° C. Preferably, the reaction is carried out under reflux conditions at temperatures of from 80° to 120° C. and requires only a short period of time for completion. Conveniently, the reactants are mixed and the temperature is allowed to rise to the desired temperature and maintained at or about this temperature during the refluxing.

The contacting of the reagents and separation and isolation of the desired product are all as previously described.

By employing the same procedures and reaction conditions as described in the immediately preceding paragraphs, nitric acid or fuming nitric acid can be employed to prepare the bis- or tris-sulfonylpyridines from either the corresponding thiopyridines or sulfinylpyridines. In a preferred procedure, the acid is employed in quantities slightly in excess of the theoretical quantities consumed by the reaction. Following the reaction, the desired product is separated in accordance with the methods previously described.

In still another procedure, potassium permanganate or chromate-sulfuric acid mixture, and conveniently the chromate as the potassium or sodium salt, can be employed as the oxidizing agent in the preparation of bis- or tris-sulfonylpyridines from the corresponding thiopyridines or sulfinylpyridines. The oxidation is carried out in the presence of a liquid medium such as water and at temperatures of from about 10° to about 70° C. In a preferred procedure, the potassium permanganate oxidation is carried out in a medium wherein the pH is less than 7. In such procedures the pH of the reaction mixture can be made acidic by the addition of acid. Representative acids include sulfuric, nitric, hydrochloric, phosphoric and acetic. The methods of isolating the desired product are all as previously described.

DESCRIPTION OF SOME PREFERRED EMBODIMENTS

The following examples illustrate the present invention and the manner by which it can be practiced but as such should not be construed as limitations upon the overall scope of the same.

Example 1.—2,3,5-trichloro-4,6-bis(methylthio)pyridine

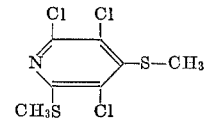

2.71 grams (0.12 gram atom) of sodium metal is dissolved in 100 milliliters of ethanol and the solution cooled. 5.75 grams (0.12 mole) of methyl mercaptan are added to the cooled solution. This solution is added over a ten minute period to a refluxing slurry composed of 15 grams (0.06 mole) of pentachloropyridine in 100 milliliters of ethanol. After the addition is complete, the mixture is refluxed at 78° C. for 2½ hours. The mixture is cooled and the solid 2,3,5-trichloro-4,6-bis(methylthio)pyridine product is separated by filtration and recrystallized from methanol. The product is obtained in a yield of 12.0 grams (71.5 percent of theoretical) and has a melting point of 108°–110° C. and is found by analysis to have carbon, hydrogen, chlorine, nitrogen and sulfur contents of 30.48, 2.20, 38.61, 5.09 and 23.3 percent, respectively, as compared to the theoretical contents of 30.6, 2.19, 38.8, 5.1 and 23.3 percent, respectively, calculated for the named structure.

Example 2.—2,3,5-trichloro-4,6-bis[(chloromethyl)thio]pyridine

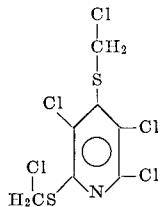

31 grams (0.11 mole) of 2,3,5-trichloro-4,6-bis(methylthio)pyridine are dissolved in 600 milliliters of dry carbon tetrachloride and contacted with chlorine for six hours at a temperature of 45°–55° C. and a chlorine gas flow of 0.45 mole per hour. The reaction mixture is allowed to stand overnight at room temperature. The carbon tetrachloride is removed by distillation under reduced pressure and the 2,3,5-trichloro-4,6-bis[(chloromethyl) thio]pyridine product is recovered and purified by crystallization from hexane. The product is recovered in a yield of 27.7 grams (71 percent of theoretical) and has a melting point of 81°–83° C.

Example 3.—3,5,6-trichloro-2,4-bis(butylthio)pyridine

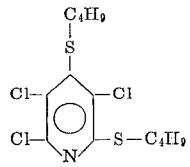

A solution is prepared by dissolving 7.6 grams (0.33 gram atom) of sodium metal in 400 milliliters of anhydrous methanol followed by the addition of 29.8 grams (0.33 mole) of butyl mercaptan to the solution. This solution is added dropwise over a 2½ hour period to a refluxing slurry composed of 40.1 grams (0.16 mole) of pentachloropyridine and 300 milliliters of methanol. At the end of the addition, the reaction mixture is refluxed for three hours at 65° C. The mixture is allowed to stand overnight at ambient atmospheric temperature and is refluxed for two hours at the reflux temperature of the mixture. The reaction mixture is cooled to room temperature and poured into water. An oily 3,5,6-trichloro-2,4-bis(butylthio)pyridine product is separated and dried. The product is recovered in a yield of 48 grams (83.5 percent of theoretical) and is found by analysis to have carbon, hydrogen, chlorine, nitrogen and sulfur contents of 43.8, 5.10, 28.8, 4.1 and 17.3 percent, respectively, as compared to the theoretical contents of 43.5, 5.04, 29.7, 3.9 and 17.9 percent, respectively, calculated for the named structure.

Example 4.—2,3,5-trichloro-4,6-bis[(chloromethyl) sulfinyl]pyridine

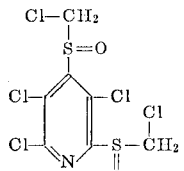

Seven (7) grams (0.0201 mole) of 2,3,5-trichloro-4,6-bis[(chloromethyl)thio]pyridine are added to 100 milliliters of concentrated nitric acid at 55° C. The temperature is allowed to rise to 85° C. and held there for five minutes. The reaction mixture is poured into a flask containing 500 milliliters of ice water. A gummy solid is recovered and dissolved in methylene chloride. The solution is chilled and the methylene chloride is removed leaving 5.5 grams (73 percent of theoretical) of crystalline 2,3,5-trichloro-4,6-bis[chloromethyl)sulfinyl]pyridine product. The product has a melting point of 145°–148° C. and is found by analysis to have carbon, hydrogen, chlorine, nitrogen and sulfur contents of 21.98, 0.85, 47.5, 3.96 and 17.46 percent, respectively, as compared to the theoretical contents of 22.2, 1.06, 47.2, 3.72 and 17.05 percent, respectively, calculated for the named structure.

Example 5.—3,5,6-trichloro-2,4-bis(butylsulfonyl) pyridine

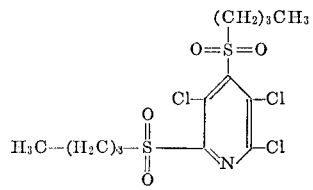

25 grams (0.07 mole) of 3,5,6-trichloro-2,4-bis(butylthio)pyridine are dissolved in a mixture containing 420 milliliters of glacial acetic acid and 75.0 grams of acetic anhydride. 77.5 grams (0.68 mole) of 31 percent hydrogen peroxide are added to the solution and the mixture is refluxed for about 7.0 hours. The reaction mixture is cooled and poured into a beaker containing 500 milliliters of ice water. The solid 3,5,6-trichloro-2,4-bis(butylsulfonyl)pyridine product is collected and crystallized from a benzene-hexane mixture. The product is obtained in a yield of 19 grams (64 percent of theoretical) and has a melting point of 97°–99° C. and is found by analysis to have carbon, hydrogen, chlorine, nitrogen and sulfur contents of 36.9, 3.9, 25.28, 3.50 and 15.37 percent, respectively, as compared to the theoretical contents of 37.0, 4.28, 25.2, 3.31 and 15.15 percent, respectively, calculated for the named structure.

Example 6.—2,3,5-trichloro-4,6-bis(methylsulfonyl) pyridine

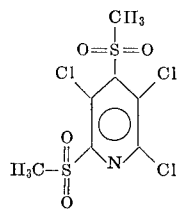

A solution is prepared in a 500 milliliter flask by dissolving 9.0 grams (0.0338 mole) of 2,3,5-trichloro-4,6-bis(methylthio)pyridine in a mixture containing 180 milliliters of glacial acetic acid and 30 grams (0.264 mole) of 30 percent hydrogen peroxide. The mixture is allowed to stand overnight at ambient room temperature. The flask is fitted with a reflux condenser and thermometer and the reactant mixture refluxed for twenty hours at the reflux temperature of the mixture. At the end of this time, the reaction mixture is cooled in a Dry Ice bath and the solid 2,3,5-trichloro-4,6-bis(methylsulfonyl)pyridine product which precipitates is collected, washed thoroughly with water and dried. The product, a white crystalline solid with a melting point of 206°–208° C., is obtained in a yield of 9.1 grams (82 percent of theoretical) and is found by analysis to have carbon, hydrogen, chlorine, nitrogen and sulfur contents of 24.87, 1.70, 31.32, 4.37 and 19.07 percent, respectively, as compared to the theoretical contents of 24.8, 1.77, 31.4, 4.13 and 18.9 percent, respectively, calculated for the named structure.

Example 7.—3,5-dichloro-2,4,6-tris(methylsulfonyl)pyridine

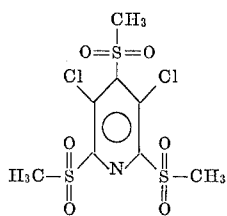

Ten grams (0.035 mole) of 3,5-dichloro-2,4,6-tris-(methylthio)pyridine are added portionwise with vigorous stirring to 150 milliliters of concentrated nitric acid. During the addition, the temperature is maintained at 25° C. After the addition is complete, the temperature of the mixture is gradually raised from 25° to 118° C. and maintained at this temperature for one hour. The reaction mixture is cooled and poured into a beaker of ice water. The resulting white solid 3,5-dichloro-2,4,6-tris-(methylsulfonyl)pyridine is filtered and dried. The product, having a melting point of about 250° C., is recovered in a yield of 13.4 grams (44.5 percent of theoretical) and is found by anaylsis to have carbon, hydrogen, chlorine, nitrogen and sulfur contents of 24.88, 2.30, 18.73, 4.08 and 24.55 percent, respectively, as compared to the theoretical contents of 25.1, 2.37, 18.5, 3.77 and 25.1 percent, respectively, calculated for the named structure.

In similar procedures, the following compounds of the present invention are prepared.

2,3,5-trichloro-4,6-bis(propylthio)pyridine (molecular weight 329) by the reaction of sodium metal, propyl mercaptan and pentachloropyridine.

3,5-dichloro-2,4,6-tris(methylthio)pyridine (melting at 118° C.) by the reaction of sodium metal, methyl mercaptan and 3,5-dichloro-2,4,6-tribromopyridine.

2,3,5-trichloro-4,6-bis(dodecylthio)pyridine as a colorless oil (molecular weight 531) by the reaction of potassium metal, dodecyl mercaptan and 2,3,5-trichloro-4,6-dibromopyridine.

2-bromo-3,5-dichloro - 4,6 - bis(methylthio)pyridine (molecular weight 318) by the reaction of sodium metal, methyl mercaptan and 2,4,6-tribromo - 3,5 - dichloropyridine.

3,5 - dichloro - 2,4-bis(methylthio)pyridine (melting at 83°-84° C.) by the reaction of potassium metal, methyl mercaptan and 2,3,4,5-tetrachloropyridine.

2,3,5-tribromo-4,6-bis(methylthio)pyridine (molecular weight of 408) by the reaction of sodium metal, methyl mercaptan and pentabromopyridine.

3,5-dichloro - 2,4,6 - tris[(chloromethyl)thio]pyridine (melting at 128°-130° C.) by the chlorination with chlorine gas of 3,5-dichloro-2,4,6-tris(methylthio)pyridine in carbon tetrachloride.

3,5 - dichloro - 2,4,6 - tris[(chloromethyl)sulfinyl]pyridine (melting at 165° C.) by oxidizing 3,5-dichloro-2,4,6-tris[(chloromethyl)thio]pyridine with fuming nitric acid.

2,3,5-trichloro-4,6 - bis[(p-chlorophenyl)thio]pyridine (molecular weight 467) by the reaction of sodium hydroxide, p-chlorophenyl mercaptan and pentachloropyridine.

2,3,5-trichloro-4,6 - bis[m-chlorobenzyl)thio[pyridine (molecular weight 495) by the reaction of sodium hydroxide, m-chlorobenzyl mercaptan and pentachloropyridine.

2,3,5 - trichloro - 4,6 - bis[(p-chlorobenzyl)sulfinyl]pyridine (molecular weight 527) by the oxidation of 2,3,5-trichloro-4,6 - bis[(p - chlorobenzyl)thio]pyridine with nitric acid.

5-chloro-4,6-bis(methylthio)pyridine (molecular weight 205) by the reaction of sodium metal, methyl mercaptan and 4,5,6-trichloropyridine.

2,3,4-tris(methylthio)pyridine (molecular weight 185) by the reaction of sodium metal, methyl mercaptan and 2,3,4-trichloropyridine.

2,3,5-trichloro-4,6 - bis(butylthio)pyridine (molecular weight 357) by the reaction of sodium metal, butyl mercaptan and pentachloropyridine.

2,3,5-trichloro-4,6-bis(methylsulfinyl)pyridine (molecular weight 305) by oxidizing 2,3,5-trichloro-4,6-bis(methylthio)pyridine with hydrogen peroxide.

2,3,5-tribromo-4,6-bis(methylsulfonyl)pyridine (melting at 233°-235° C.) by oxidizing 2,3,5-tribromo-4,6-bis(methylthio)pyridine with hydrogen peroxide and glacial acetic acid.

2,3,5-trichloro-4,6-bis(dodecylsulfonyl)pyridine (melting at 72°-74° C.) by oxidizing 2,3,5-trichloro-4,6-bis(dodecylthio)pyridine with hydrogen peroxide and glacial acetic acid/acetic anhydride.

2,3,5 - trichloro - 4,6 - bis[(p-chlorophenyl)sulfonyl]pyridine (melting at 110°-114° C.) by oxidizing 2,3,5-trichloro-4,6-bis[(p-chlorophenyl)thio]pyridine with hydrogen peroxide, glacial acetic acid and acetic anhydride.

2,3,5-trichloro-4,6 - bis(propylsulfonyl)pyridine (melting at 95°-98° C.) by oxidizing 2,3,5-trichloro-4,6-bis(propylthio)pyridine with hydrogen peroxide and glacial acetic acid.

3,5-dichloro-2,4-bis(methylsulfonyl)pyridine (melting at 227.5° C.) by oxidizing 3,5-dichloro-2,4-bis(methylthio)pyridine with concentrated nitric acid.

3,5-dibromo-2,4,6-tris(methylsulfonyl)pyridine (melting at 272°-273° C.) by oxidizing 3,5-dibromo-2,4,6-tris(methylthio)pyridine with a mixture of potassium chromate and sulfuric acid.

2,3,5-trichloro-4-(methylsulfonyl) - 6 - (butylsulfonyl)pyridine (molecular weight 379) by oxidizing 2,3,5-trichloro-4-(methylthio)-6-(butylthio)pyridine with concentrated nitric acid.

2,3,5-trichloro-4-[(chloromethyl)sulfinyl] - 6 - (butylsulfinyl)pyridine (molecular weight 381) by oxidizing 2,3,5-trichloro-4-[(chloromethyl)thio] - 6 - (butylthio)pyridine with nitric acid.

2,3,5-trichloro-4,6-bis(n - hexylsulfinyl)pyridine (melting at 62.5° C.) by refluxing 2,3,5-trichloro-4,6-bis-(n-hexylthio)pyridine with concentrated nitric acid for ten minutes at 85° C.

2,3,5 - trichloro - 4 - methylthio) - 6 - (butylthio)-pyridine (molecular weight 315) by the reaction of sodium metal, butyl mercaptan and 2,3,5-trichloro-4-methylthio-6-bromopyridine.

In accordance with the present invention, it has been discovered that the bis- and tris-(thio-, sulfinyl- and sulfonyl)pyridine compounds can be employed as pesticides for the control of many bacterial, terrestrial and aquatic plants, fungal and insect pests. A particular advantage of the present invention is that the compounds are of low toxicity to mammals and to most higher plants and can be applied to many plants and plant parts for fungal control without significant injury to the plants. Thus, they can be applied to the aerial portions of growing plants to control leaf-attacking fungal organisms, dispersed in the soil to control the root-attacking organisms of mold and damping-off and applied to orchard floor surfaces to control over-wintering spores of many fungal organisms.

Surprisingly, certain of the new pyridine compounds give selective pre-emergent control of Amaranthus species (pigweeds) without harming other common plants. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay and may also be employed as a toxicant to control insect pests.

The exact concentration of the toxicant to be employed in the treating compositions is not critical and may vary considerably, provided the required dosage of the effective agent is supplied in the ink, adhesive, soap, cutting oil, polymeric material, paint, textile, paper, wood or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight.

In a representative operation, each of the compounds, 3,5 - dichloro - 2,4,6 - tris(methylsulfonyl)pyridine, 2,3,5- trichloro - 4,6 - bis(methylsulfonyl)pyridine, 2,3,5-tribromo - 4,6 - bis(methylsulfonyl)pyridine, 3,5 - dichloro-2,4,6 - tris(methylthio)pyridine and 2,3,5 - trichloro-4,6-bis[(p - chlorophenyl)sulfonyl]pyridine, when employed as the sole toxicant in a nutrient agar at a concentration of about 500 parts by weight of the compound per million parts of agar, is found to give 100 percent kill and control of the organism *Staphylococcus aureus*. The compounds, 3,5-dichloro-2,4,6 - tris[(chloromethyl)-sulfinyl]pyridine, 3,5-dichloro - 2,4 - bis(methylsulfonyl)pyridine, 2,3,5 - trichloro - 4,6 - bis(methylsulfonyl)pyridine, 2,3,5-trichloro - 4,6 - bis[(chloromethyl)sulfinyl]pyridine and 2,3,5 - trichloro - 4,6 - bis[(p - chlorophenyl)sulfonyl]pyridine, when employed at the same toxicant concentration and nutrient agar, give 100 percent kill and control of the organism *Trichophyton mentagrophytes*. In each of the above determinations, the check nutrient agar supports a heavy growth of the test organisms.

In an additional operation, 3,5-dichloro-2,4-bis(methylsulfonyl)pyridine and 2,3,5 - trichloro - 4,6 - bis(propylsulfonyl)pyridine are found to give 100 percent kill and control of the organisms *Rhizopus nigricans* and *Aspergillus terreus* when employed at the same toxicant concentration and nutrient agar. 2,3,5 - trichloro - 4,6 - bis[(chloromethyl)sulfinyl]pyridine, 2,3,5 - trichloro - 4,6- bis(dodecylsulfonyl)pyridine, 2,3,5 - trichloro - 4,6 - bis[(p-chlorophenyl)sulfonyl]pyridine, 2,3,5 - trichloro-4,6-bis(propylsulfonyl)pyridine and 3,5,6 - trichloro - 2,4-bis(butylsulfonyl)pyridine are also found to give 100 percent kill and control of the organism *Mycobacterium phlei* when employed at the same toxicant concentration and nutrient agar.

3,5,6 - trichloro - 2,4 - bis(butylsulfonyl)pyridine and 2,3,5 - trichloro - 4,6 - bis(propylsulfonyl)pyridine are found to give 100 percent kill and control of the organisms *Candida albicans, Candida pelliculosa, Pullularia pullulans, Bacillus subtilus, Staphylococcus aureus* and *Trichophyton mentagrophytes* and 2,3,5 - tribromo - 4,6-bis(methylsulfonyl)pyridine is found to give 100 percent kill and control of the organism *Candida albicans*. In each of the above determinations, the toxicant concentration and nutrient agar are as above and in each, the check nutrient agar supports a heavy growth of the test organism.

In other representative operations, 3,5,6-trichloro-2,4-bis(butylsulfonyl)pyridine and 2,3,5 - trichloro - 4,6 - bis (propylsulfonyl)pyridine, each when employed as the sole toxic constituent in liquid compositions in amounts of at least 10 parts per million of the ultimate composition, give 100 percent kill and control of *Chlorella algae* when applied to the plant or its surroundings. In other operations, aqueous compositions containing one of 3,5-dichloro-2,4-bis(methylsulfonyl)pyridine, 2,3,5 - tribromo - 4,6 - bis (methylsulfonyl)pyridine, 2,3,5 - trichloro - 4,6 - bis[(p-chlorophenyl)sulfonyl]pyridine, 2,3,5 - trichloro - 4,6 - bis(dodecylsulfonyl)pyridine, 2,3,5 - trichloro - 4,6 - bis (dodecylthio)pyridine, 2,3,5 - trichloro - 4,5 - bis(propylthio)pyridine, 3,5,6 - trichloro - 2,4 - bis(butylsulfonyl) pyridine, 3,5,6 - trichloro - 2,4 - bis(butylthio)pyridine, 2,3,5 - trichloro - 4,6 - bis(methylthio)pyridine and 3,5-dichloro - 2,4 - bis(methylthio)pyridine as the only active toxicant at a concentration of 10 pounds per acre give 100 percent kill and control of pigweeds.

In still further representative operations each of 2,3,5-trichloro - 4,6 - bis[(chloromethyl)thio] - pyridine, 3,5-dichloro - 2,4,6 - tris(methylthio)pyridine, 2,3,5 - trichloro - 4,6 - bis(dodecylthio)pyridine, 2,3,5-trichloro-4,6 - bis[(chloromethyl)sulfinyl]pyridine and 2,3,5-trichloro - 4,6-bis[(p-chlorophenyl)sulfonyl]pyridine, when employed as the sole toxicant constituent in aqueous compositions and at a concentration of 4,000 parts per million by weight of the composition, give complete kill and control of bean mildew.

In another operation, aqueous compositions containing one of 2,3,5 - trichloro - 4,6 - bis(methylsulfonyl) - pyridine and 2,3,5 - trichloro - 4,6 - bis(propylsulfonyl)pyridine, at a concentration of 10 parts per million by weight of the ultimate composition, give complete kills of the water plants Elodea, Cabomba and moneywort. In other operations, 3,5 - dichloro - 2,4 - bis(methylthio)pyridine, 2,3,5 - trichloro - 4,6 - bis[(chloromethyl)thio pyridine, 2,3,5 - trichloro - 4,6 - bis(propylthio)pyridine, 2,3,5 - trichloro - 4,6 - bis[(chloromethyl)sulfinyl]-pyridine and 2,3,5 - trichloro - 4,6 - bis(propylsulfonyl) pyridine, each when employed in an aqueous composition at a concentration of 5 parts per million by weight, give 100 percent kill of yellow fever mosquito larvae.

In another representative operation, aqueous dispersions containing one of 2,3,5 - trichloro - 4,6 - bis[(chloromethyl)thio]pyridine and 2,3,5 - trichloro - 4,6 - bis-(dodecylsulfonyl)pyridine at concentrations of 500 parts per million by weight give substantially complete kills of Southern army worms. In other operations, aqueous dispersions containing 2,3,5 - trichloro - 4,6 - bis - (methylsulfonyl)pyridine, at concentrations of 500 parts per million by weight, give complete kills of two-spotted spider mites.

In further operations, aqueous compositions containing one of 3,5 - dichloro - 2,4,6 - tris[(chloromethyl) - thio] pyridine and 2,3,5 - trichloro - 4,6 - bis(propylsulfonyl) pyridine, at concentrations of 400 parts per million by weight, give substantially complete kills of rice plast organisms. In other operations, aqueous compositions containing one of 2,3,5 - trichloro - 4,6 - bis(propylthio)pyridine, 2,3,5 - trichloro - 4,6 - bis[(chloromethyl)sulfionyl] pyridine and 2,3,5 - trichloro - 4,6 - bis(propylsulfonyl) pyridine, at a concentration of 400 parts per million by weight, give complete kills of downy mildew. In another operation, aqueous compositions containing one of 3,5-dichloro - 2,4,6 - tris[(chloromethyl)sulfinyl]pyridine, 2,3,5 - trichloro - 4,6 - bis(methylsulfonyl)pyridine and 2,3,5 - trichloro - 4,6 - bis(propylsulfonyl)pyridine, at a concentration of 400 parts per million by weight, give complete kills of apple scab fungus organisms.

In other operations, aqueous dispersions of 2,3,5-trichloro - 4,6 - bis[(chloromethyl)thio]pyridine, at a concentration of 150 parts per million by weight, give complete kills of powdery mildew. In other operations, aqueous compositions of 2,3,5 - trichloro - 4,6 - bis-[(chloromethyl)sulfinyl]pyridine at a concentration of 150 parts per million by weight, give complete kills of potato late blight. In another operation, aqueous compositions of each of 2,3,5-trichloro - 4,6-bis(methylsulfonyl)pyridine and 3,5-dichloro - 2,4,6-tris(methylsulfonyl)pyridine, at a concentration of 100 parts per million by weight, give complete kills of potato scab fungus. In other operations, aqueous compositions containing one of 2,3,5 - trichloro - 4,6 - bis(methylsulfonyl)pyridine and 2,3,5 - trichloro - 4,6 - bis(propylsulfonyl)pyridine, at a concentration of 400 parts per million by weight, give complete control of tomato late blight.

In another operation, aqueous compositions of 2,3,5-trichloro - 4,6 - bis(methylsulfonyl)pyridine, at a concentration of 10 parts per million by weight, give complete kill and control of fire blight bacterium, *Bacillus cereus* and *Salvinia rotundifolia* and at 100 parts per million by weight, give complete control of citrus green mold, *Verticillium alboatrum* and poultry enteric disease.

In other operations, aqueous dispersions of 3,5 - dichloro - 2,4,6-tris(methylsulfonyl)pyridine, at concentrations of 100 parts per million by weight, give 100 percent kill and control of fire blight bacterium and *Phythium ultimum*.

PREPARATION OF STARTING MATERIALS

The 2,3,4 - trichloropyridine, 2,3,4,5 - tetrachloropyridine, 2,3,4,6-tetrachloropyridine and 2,3,4,5,6-pentachloropyridine employed as above described can be prepared in known procedures by conventional liquid or vapor phase techniques for the halogenation of pyridine or halopyridines such as those taught in U.S. Pats. Nos. 1,977,662 and 3,186,994 and in Sell, J. Chem. Soc., vol. 93, pp. 1993–5 (1908). 2,3,4,5 - tetrachloropyridine, 2,3,4,6-tetrachloropyridine and 2,3,4,5,6 - pentachloropyridine can also be prepared in known procedures by the halogenation of pyridine in glacial acetic acid and preferably at the boiling temperature of the mixture.

The pentabromopyridine starting material can be prepared by known procedures for vapor phase bromination of pyridine. Similar mixed halopyridines wherein one or both of the 2, 4 and/or 6 positions are occupied by bromine are also employed in the production of various starting materials. These products are readily obtained in known procedures wherein the above-identified tetrachloropyridine and pentachloropyridines are treated with gaseous hydrogen bromide in glacial acetate acid and conveniently at the boiling temperature and under reflux. Following the exchange, the desired product is separated by conventional procedures such as washing with water, extraction and fractional distillation. Other methods for preparing mixed halopyridines are taught in U.S. Pat. No. 3,371,011.

The halophenyl- and halobenzyl mercaptans employed as starting materials are commercial products and may be prepared by known procedures such as the one set forth in Rec. Trav. Chem. at 76, 180–186 (1957) wherein benzene sulfonyl halides or benzyl sulfonyl halides are prepared by the halosulfonation of phenol or benzyl alcohol followed by the reduction of the sulfonyl halide with metallic zinc in acetic acid.

The thiopyridine starting material characterized by the formula

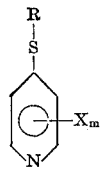

are prepared in accordance with known methods. In such method, a suitable alkali metal mercaptan is reacted with a halopyridine. The reaction proceeds readily at temperatures of from 60° to 100° C. with the production of the desired thiopyridine starting material and alkali metal halide of reaction. This method of preparation as well as others are taught in U.S. Pats. Nos. 3,296,272, 3,364,223 and 3,371,011.

What is claimed is:
1. The compound corresponding to the formula

wherein each R, taken separately, represents alkyl having up to 12 carbon atoms, monohaloloweralkyl, dihaloloweralkyl, trihaloloweralkyl, phenyl, monohalophenyl, benzyl and monohalobenzyl; M represents sulfide (—S—), sulfinyl

or sulfonyl

and Z represents

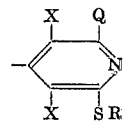

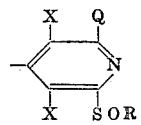

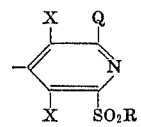

in which X represents chlorine, bromine or hydrogen and Q represents —SR, —SOR, —SO$_2$R, hydrogen, chlorine or bromine, with the proviso that when X is bromine, Q is other than chlorine.

2. The compound of claim 1 wherein the compound is a member selected form the group consisting of 2,3,5-trichloro - 4,6 - bis(dodecylsulfonyl)pyridine, 2,3,5-trichloro - 4,6 - bis(methylsulfonyl)pyridine, 2,3,5-trichloro-4,6 - bis (butylsulfonyl)pyridine and 2,3,5 - trichloro-4,6-bis(propylsulfonyl)pyridine.

3. The compound of claim 1 wherein the compound is a member selected from the group consisting of 3,5-dichloro - 2,4,6 - tris[(chloromethyl)sulfinyl]pyridine, 3,5 - dichloro - 2,4,6 - tris(methylthio)pyridine, 3,5-dichloro - 2,4,6 - tris(methylsulfonyl)pyridine and 3,5-dichloro-2,4-bis(methylthio)pyridine.

4. The compound of claim 1 wherein the compound is a member selected from the group consisting of 3,5,6-trichloro - 2,4-bis(butylthio)pyridine and 3,5,6-trichloro-2,4-bis(butylsulfonyl)pyridine.

5. The compound of claim 1 wherein the compound is a member selected from the group consisting of 2,3,5-tribromo - 4,6 - bis(methylsulfonyl)pyridine, 2,3,5 - trichloro - 4,6 - bis[(p-chlorophenyl)sulfonyl]pyridine, 2,3,5 - trichloro - 4,6 - bis[(chloromethyl)thio]pyridine and 2,3,5 - trichloro - 4,6 - bis[(chloromethyl)sulfonyl] pyridine.

6. The compound of claim 1 wherein the compound is a member selected from the group consisting of 2,3,5-trichloro - 4,6 - bis(dodecylthio)pyridine, 2,3,5 - trichloro-4,6 - bis(propylthio)pyridine and 2,3,5 - trichloro - 4,6-bis(methylthio)pyridine.

References Cited

UNITED STATES PATENTS 3,296,272  1/1967  Johnston _____ 260—294.8
3,364,223  1/1968  Johnston _____ 260—294.8
3,415,832  12/1968  Crawford _____ 260—294.8

ALAN L. ROTMAN, Primary Examiner

U.S. Cl. X.R.

424—263